United States Patent [19]
Murphy et al.

[11] Patent Number: 6,086,486
[45] Date of Patent: Jul. 11, 2000

[54] ADJUSTABLE PRACTICE TEE

[75] Inventors: Thomas M. Murphy, Atkinson, N.H.; Walter H. Brauer, Roslindale, Mass.

[73] Assignee: Adjustotee LLC, Atkinson, N.H.

[21] Appl. No.: 09/235,072

[22] Filed: Jan. 21, 1999

Related U.S. Application Data

[60] Provisional application No. 60/072,234, Jan. 23, 1998.

[51] Int. Cl.[7] .................................................. A63B 57/00
[52] U.S. Cl. ............................................ 473/397; 473/400
[58] Field of Search ...................................... 473/387–403

[56] References Cited

U.S. PATENT DOCUMENTS

| | | | |
|---|---|---|---|
| 1,803,907 | 5/1931 | Kruse | 473/398 |
| 2,457,670 | 12/1948 | Harvey | 473/397 |
| 3,516,664 | 6/1970 | Brennan | 473/396 |
| 5,156,403 | 10/1992 | Martino | 473/396 |
| 5,743,819 | 4/1998 | Chun | 473/396 |
| 5,766,100 | 6/1998 | Dilmore | 473/396 |

*Primary Examiner*—Steven Wong
*Attorney, Agent, or Firm*—Weingarten, Schurgin, Gagnebin & Hayes LLP

[57] ABSTRACT

An adjustable golf practice tee is presented. The adjustable golf practice tee is used at a driving range for practicing a wide variety of golf shots. The adjustable golf practice tee includes a base portion and a base portion extension which has a tee pivotally attached thereto. The adjustable golf practice tee is adjustable in height, such that the user can select a personal preference for the height of the shot being practiced. Additionally, since the adjustable golf practice tee incorporates a tee which closely resembles a regulation golf tee used during a round of golf, the look and feel experienced by the user when using the adjustable golf practice tee is more like the actual shots the user will be employing during a round of golf.

22 Claims, 2 Drawing Sheets

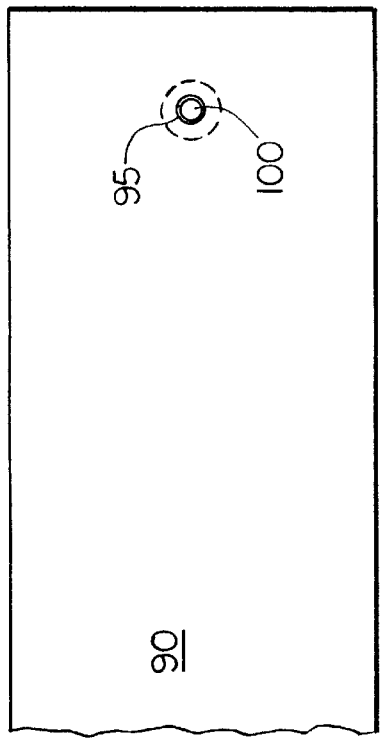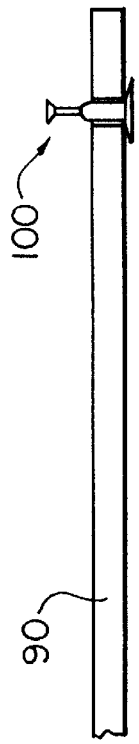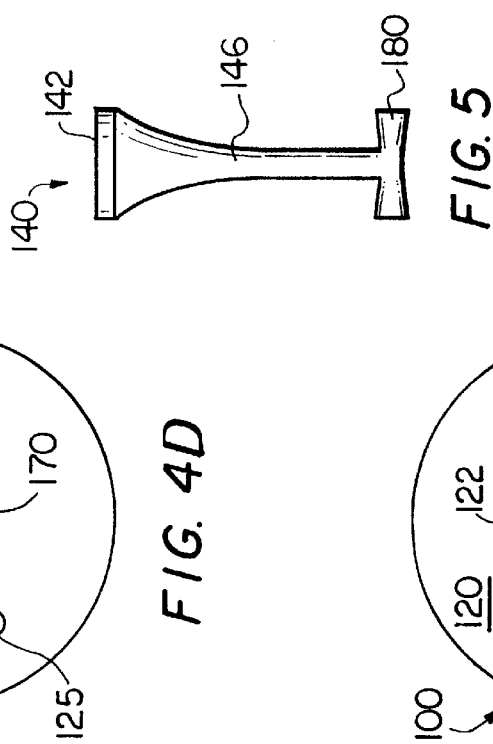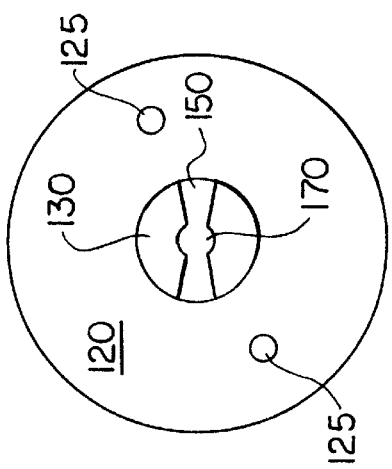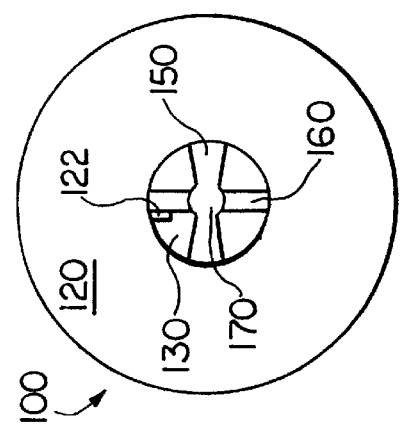

ADJUSTABLE PRACTICE TEE

CROSS REFERENCE TO RELATED APPLICATIONS

This application claims priority under 35 U.S.C. §119(e) to provisional patent application Ser. No. 60/072,234 filed Jan. 23, 1998; entitled: ADJUSTABLE PRACTICE TEE, the disclosure of which is incorporated herein by reference.

STATEMENT REGARDING FEDERALLY SPONSORED RESEARCH OR DEVELOPMENT

Not Applicable

BACKGROUND OF THE INVENTION

Most golf practice driving ranges include a hitting area with multiple synthetic turf mats, each mat having a removable tee on one side. Generally, the tee is a soft synthetic rubber tube that is a fixed height. This fixed height of the tee does not allow for individual preference for teeing the ball nor does the tee allow for different heights to be used for different clubs. This is a limiting factor on practicing various types of golf shots at a driving range. In addition, the large diameter of the tee does not resemble the standard playing tee used at the golf course in either shape or the feel of the shot. Accordingly, the sensation that is transmitted via the club to the hands as the club impacts the ball during the golf swing is different when using the practice tee at a driving range as compared to the use of a regulation tee on a golf course. It would be desirable to have a golf practice tee that more closely resembles a regulation tee used on a golf course, and which has an adjustable height to allow a user to select a personal preference and to practice a wider variety of shots.

BRIEF SUMMARY OF THE INVENTION

An adjustable golf practice tee is presented. The adjustable golf practice tee is used at a driving range for practicing a wide variety of golf shots. The adjustable golf practice tee includes a base portion and a base portion extension which has a tee pivotally attached thereto. The tee of the adjustable golf practice tee is adjustable in height, such that the user can select a personal preference for the height of the shot being practiced. Additionally, since the adjustable golf practice tee incorporates a tee which closely resembles a regulation golf tee used during a round of golf, the look and feel experienced by the user when using the adjustable golf practice tee is more like the actual shots the user will be employing during a round of golf.

BRIEF DESCRIPTION OF THE SEVERAL VIEWS OF THE DRAWING

The invention will be more fully understood from the following detailed description taken in conjunction with the accompanying drawings in which:

FIG. 4C is a bottom view of the adjustable golf practice tee of FIG. 4A;

FIG. 4D is a top view of the adjustable golf practice tee of FIG. 4A;

FIG. 5 is a side view of a tee having an integral pivot element;

FIG. 6A is a top view of the adjustable golf tee of FIG. 4A installed in a mat; and FIG. 6B is side view of the adjustable golf tee installed in a mat shown in FIG. 6A.

DETAILED DESCRIPTION OF THE INVENTION

Figure 1A:
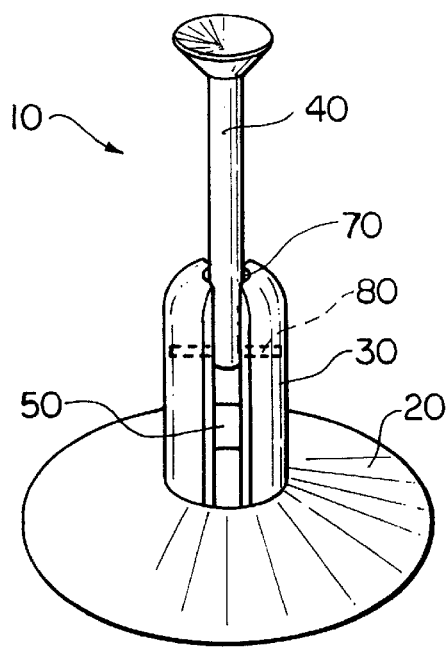
FIG. 1A is an isometric view of the adjustable golf tee of the present invention.
Figure 1B:
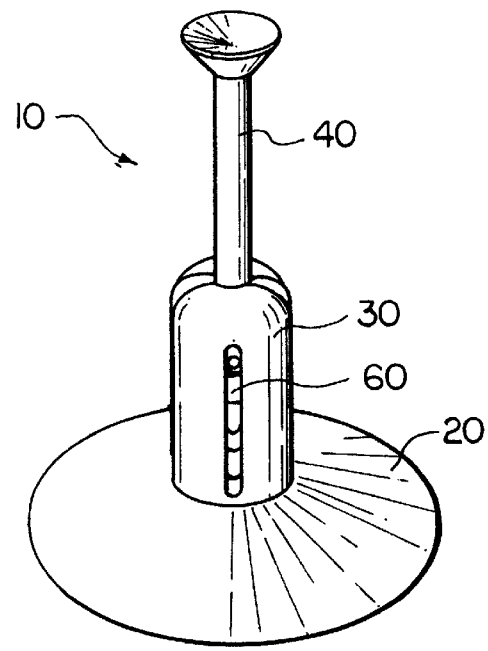
FIG. 1B is an isometric view of the adjustable golf tee of FIG. 1A.

An adjustable practice golf tee is presented. Referring to FIGS. 1A–1B, a first embodiment of the adjustable golf practice tee 10 includes a base 20, a base extension 30 having a first slot 50, a second slot 60, and a central bore 70 for receiving a tee 40 partially therein. The tee 40 of the adjustable golf practice tee 10 includes a pivot element 80 which extends through a lower portion of the tee 40 and is fit into the second slot 60 such that tee 40 is rotatable within the base extension 30 about the pivot element 80. Additionally, the tee 40 and pivot element 80 are adjustable vertically, such that the height of the tee 40 can be set to the height desired by the person using the adjustable golf practice tee 10.

Base 20 is a generally circular disk of resilient material. While a circular shape is shown and described, any other shape could also be utilized. Base extension 30 is attached to base 20. While base extension 30 is described as a separate piece, it could also be formed integrally with base 20. Base extension 30 includes a central bore 70 disposed partially therethrough from the top surface. The central bore 70 has a diameter which is slightly less than the diameter of the tee body 46, such that the bore 70 provides frictional engagement of the tee 40, allowing the tee 40 to be inserted within the base extension 30 and adjusted to any desired height within the base extension 30. Base 20 and base extension 30 are comprised of a generally resilient material such as polycarbonate or polypropolene.

Figure 2:
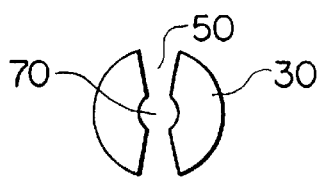
FIG. 2 is a top view of the base extension of the adjustable golf tee of FIG. 1A.

Referring now to FIG. 2, a top view of the base extension 30 is shown. The base extension 30 includes a central bore 70 which has a diameter slightly smaller than the diameter of the body 46 of the tee 40. As such, tee 40 is positionable vertically within the base extension 30. Base extension 30 further includes slot 50 which allows the tee 40 to be knocked over from a first vertical position to a second nonvertical position. The tee 40 is movable between the first and second positions by pivoting about the pivot element 80 which extends through the body 46 of the tee 40 and is contained within slot 60 (not shown).

Figure 3:
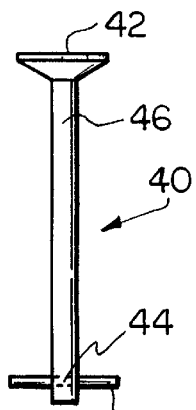
FIG. 3 is a side view of the tee of the adjustable golf tee of the present invention.

Referring now to FIG. 3, tee 40 of the adjustable golf practice tee is shown. Tee 40 is comprised of a generally rigid material, such as wood, rubber, metal or nylon, and preferably plastic. Tee 40 is similar to a regulation golf tee and includes a top area 42 for supporting a golf ball placed thereupon. Tee 40 also includes a body portion 46 having a substantially uniform diameter. A pivot element 80 is disposed through a lower section of the body portion 44 of tee 40 and allows tee 40 to pivot about the pivot element within slot 50 of the base extension 30. Pivot element 80 is disposed within slot 60 in combination with pivot element 80 serves to prevent the tee 40 from leaving the slot 60 in the event that the tee 40 is struck by the club during a golf swing.

Figure 4A:
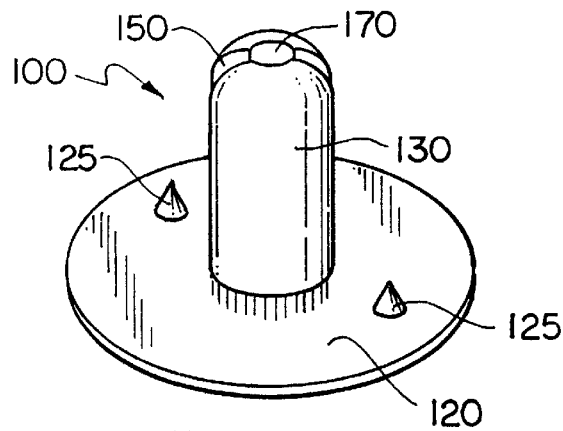
FIG. 4A is a perspective view of a second embodiment of the base portion of the adjustable golf practice tee.
Figure 4B:
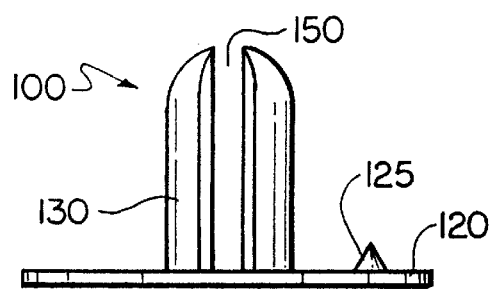
FIG. 4B is a side view of the adjustable golf practice tee of FIG. 4A.

Referring now to FIGS. 4A–5, a further embodiment of the adjustable golf practice tee 100 is shown. Adjustable golf practice tee 100 includes a base 120 and a base extension 130 having a first slot 150, a second slot 160, and a central bore 170 for receiving a tee 140 partially therein.

Base 120 is a generally circular disk of resilient material. While a circular shape is shown and described, any other shape could also be utilized. Base 120 includes a plurality of anchoring points 125. The anchoring points 125 are disposed on an upper surface of base 120 and provide frictional engagement with a driving range mat when the tee 100 is installed with the mat. While the anchoring points are shown as conical shaped protuberances, any other shape which would also provide frictional engagement of the mat could also be utilized.

Base extension 130 is attached to base 120. Base extension 130 may be a separate piece or be formed integrally with base 120. Base extension 130 has a curved top surface which functions to minimize the impact of a swung golf club on the base 120 and base extension 130. Base extension 130 includes a central bore 170 disposed therethrough. The central bore 70 has a diameter which is slightly less than the diameter of the tee body 146, such that the bore 170 provides frictional engagement of the tee 140, allowing the tee 140 to be inserted within the base extension 130 and adjusted to any desired height within the base extension 130. Base extension 130 further includes a first slot 150 disposed through the base extension. First slot 150 has a shape wherein the ends of the slot are wider than the central portion, giving the slot an opposing V-shape when the slot is viewed from above or below. This opposing V-shape allows the tee to be inserted from the top of the base extension. Base extension 130 further includes a second slot 160 disposed therein. Second slot 160 may also have a shape wherein the ends of the slot are wider than the central portion, giving the slot an opposing V-shape. Second slot 160 receives a pivot element 180 of tee 140 therein and provides for tee 140 to be movable vertically within base extension 130. The first slot 150 and second slot 160 are arranged generally perpendicular to each other. The base includes a ramp section which interconnects the bottom edge of the second slot 160 to the bottom edge of first slot 150 so that when the tee 140 is inserted into slot 150, tee 140 is slid down the first slot 150 and rotated approximately 90 degrees, such that the pivot element 180 rides along the ramp section and is disposed within second slot 160. The ramp section may further include a locking member 122 to secure the pivot element 180 of tee 140 within second slot 160. The bottom of the slots and the ramp are configured such that during the insertion and rotation process of the tee within the base and base extension, the bottom most portion of the tee does not extend beyond the bottom surface of the base, thus the tee is insertable without removing the base from its position, such as when the adjustable golf practice tee is extending through a mat when used at a driving range.

The tee 140 of the adjustable golf practice tee 100 includes an integral pivot element 180 which extends from the bottom of the tee 140 and is fit into the second slot 160 such that tee 140 is rotatable within the base extension 130 about the pivot element 180. Additionally, the tee 140 and pivot element 180 are adjustable vertically, such that the height of the tee 140 can be set to the height desired by the person using the adjustable golf practice tee 100.

Referring now to FIGS. 6A and 6B, the adjustable golf practice tee 100 is shown installed in a practice mat 90. The adjustable golf practice tee 100 extends from underneath the mat 90 through a hole 95 in the practice mat 90. The base 120 of the adjustable golf practice tee is positioned below the mat and serves to keep the adjustable golf practice tee properly positioned within the mat 90 and to provide a stable environment for golf practice. The base extension 130 and tee 140 of the adjustable golf practice tee 100 extend through the hole 95 in the mat 90 and is thus repeatably usable by a person to practice a variety of golf shots.

The user stands on the mat 90, and places a golf ball on the adjustable golf practice tee 100. The adjustable golf practice tee 100 is substantially vertical and the height of the tee 140 extending above the surface of the mat 90 can be adjusted to the users personal preference for the particular shot being practiced. For example, the tee 140 may be adjusted such the golf ball is at its lowest point for practicing fairway shots, while the tee 140 can be adjusted to its highest position to practice tee shots. The adjustable golf practice tee 100 is also positioned with respect to the user such that slot 150 is aligned generally along the desired line of flight of the practice shot.

Once the tee 140 is adjusted to the proper height and a golf ball placed thereon, the user takes a golf swing, hopefully striking the ball. As the ball is struck by the user, the tee 140 of the adjustable golf practice tee 100 may be deflected from a first generally vertical position, to a second position which may end up being generally horizontal by rotating about pivot element 180 and within slot 150. If the user desires to make another practice shot, the user repositions the tee 140 from its second position back to the first generally vertical position. The tee 140 can be adjusted vertically to the desired height, and a golf ball placed on the top 142 of tee 140. Another golf swing is taken and the entire procedure repeated until the user desires to stop practicing golf shots.

An adjustable golf practice tee which includes a tee pivotally attached to a base is adjustable in height, such that the user can select a personal preference for the height of the shot being practiced. Additionally, since the practice tee incorporates a tee which closely resembles the regulation golf tee used during a round of golf, the look and feel experienced by the user when using the practice tee is more like the actual shots the user will be employing during a round of golf thus providing a more realistic feel to the practice shots.

Having described preferred embodiments of the invention it will now become apparent to those of ordinary skill in the art that other embodiments incorporating these concepts may also be used. Accordingly, it is submitted that the invention should not be limited to the described embodiments but rather should only be limited by the spirit and scope of the appended claims.

I claim:

1. An adjustable golf tee comprising:

a base;

a base extension extending from said base, the base extension having a top surface and including a first slot extending from the top surface of said base extension and through at least a portion of said base extension, a second slot extending within a portion of said base extension, and a central bore having a first diameter extending along a vertical axis from a top surface of said base extension a predetermined distance within said base extension;

a tee having a first end for supporting a golf ball and a second end extending into the bore of said base extension, and wherein said tee is adjustable in a vertical direction within said base extension; and a pivot element extending from a portion of said tee and disposed within said second slot of said base extension wherein said tee is pivotable within said first slot about said pivot element between a first generally vertical position to a second position.

2. The adjustable golf tee of claim 1 wherein a diameter of a body of said tee is larger than the first diameter of said central bore of said base extension.

3. The adjustable golf tee of claim 1 wherein said pivot element is integral with said tee.

4. The adjustable golf tee of claim 1 wherein said second slot is disposed generally perpendicular to said first slot.

5. The adjustable golf tee of claim 1 wherein said base has a generally circular shape.

6. The adjustable golf tee of claim 1 wherein said base extension has a generally cylindrical shape.

7. The adjustable golf tee of claim 1 wherein the top surface of said base extension has a generally curved shape.

8. The adjustable golf tee of claim 1 wherein said base and said base extension are aligned along a common central vertical axis.

9. The adjustable golf tee of claim 1 wherein said base and said base extension are integral.

10. The adjustable golf tee of claim 1 wherein said base comprises a resilient material.

11. The adjustable golf tee of claim 1 wherein said base extension comprises a resilient material.

12. The adjustable golf tee of claim 1 wherein said tee comprises a resilient material.

13. The adjustable golf tee of claim 1 wherein said base, said base extension and said tee comprise material selected from the group consisting of polycarbonate and polypropolene.

14. The adjustable golf tee of claim 1 wherein said pivot element includes a first end and a second end and wherein each of said first end and said second end have a generally conical shape.

15. The adjustable golf tee of claim 1 wherein said tee is insertable into said base extension from the top surface of said base extension.

16. The adjustable golf practice tee of claim 1 wherein said first slot is shaped such that each end of said slot is wider than a central portion of said slot.

17. The adjustable golf practice tee of claim 1 wherein said second slot is shaped such that each end of said slot is wider than a central portion of said slot.

18. The adjustable golf practice tee of claim 1 wherein said base includes at least one anchoring point extending from a top surface of said base.

19. The adjustable golf tee of claim 18 wherein said anchoring point has a conical shape.

20. The adjustable golf tee of claim 1 wherein said base portion includes a locking ramp extending between a bottom edge of said first slot and a bottom edge of said second slot.

21. The adjustable golf tee of claim 20 wherein said first slot, said second slot and said locking ramp are positioned within said base and base extension such that said tee does not extend beyond a bottom surface of said base when said tee is inserted and rotated into position within said adjustable golf tee.

22. An adjustable golf tee comprising:
a base including a base extension having a top surface and a first slot extending from the top surface of said base extension and through at least a portion of said base extension, a second slot generally perpendicular to said first slot and extending within a portion of said base extension, and a central bore having a first diameter and extending along a vertical axis from the top surface of said base extension; and
a tee having a first end for supporting a golf ball, a second end extending into the bore of said base extension, and a pivot element extending from a portion of said tee and disposed within said second slot of said base extension, wherein said tee is movable in a vertical direction within said second slot and wherein said tee is pivotable within said first slot about said pivot element between a first generally horizontal position to a second position.

* * * * *